United States Patent
Knowlton et al.

(10) Patent No.: US 8,884,589 B2
(45) Date of Patent: Nov. 11, 2014

(54) METHOD AND SYSTEM FOR POWER SWITCH TEMPERATURE REGULATION

(75) Inventors: Timothy J. Knowlton, Benson, AZ (US); Christopher Fischbach, Tucson, AZ (US)

(73) Assignee: Standard Microsystems Corporation, Hauppauge, NY (US)

(*) Notice: Subject to any disclaimer, the term of this patent is extended or adjusted under 35 U.S.C. 154(b) by 369 days.

(21) Appl. No.: 13/232,965

(22) Filed: Sep. 14, 2011

(65) Prior Publication Data

US 2013/0063098 A1    Mar. 14, 2013

(51) Int. Cl.
*H02J 7/04* (2006.01)
*H02J 7/00* (2006.01)

(52) U.S. Cl.
CPC ............ *H02J 7/0091* (2013.01); *H02J 7/0052* (2013.01); *H02J 2007/0062* (2013.01)
USPC ............................ 320/150; 320/153; 320/137

(58) Field of Classification Search
USPC .................. 320/150, 137; 361/7, 37, 79, 93.8
See application file for complete search history.

(56) References Cited

U.S. PATENT DOCUMENTS

| | | | |
|---|---|---|---|
| 6,516,227 B1* | 2/2003 | Meadows et al. | 607/46 |
| 6,861,824 B1* | 3/2005 | Liu et al. | 320/164 |
| 6,905,362 B2* | 6/2005 | Williams | 439/490 |
| 6,987,655 B2* | 1/2006 | Kesler et al. | 361/103 |
| 7,446,501 B2* | 11/2008 | Aleyraz et al. | 320/101 |
| 7,759,906 B2* | 7/2010 | Ferguson | 320/164 |
| 8,212,531 B2* | 7/2012 | Nollet | 320/152 |
| 8,552,596 B2* | 10/2013 | Ichikawa et al. | 307/104 |
| 8,582,266 B2* | 11/2013 | Bertin et al. | 361/93.8 |
| 2004/0217744 A1* | 11/2004 | Walters et al. | 323/277 |
| 2007/0148539 A1* | 6/2007 | Pellenc | 429/156 |
| 2009/0139972 A1* | 6/2009 | Baker et al. | 219/201 |
| 2010/0010582 A1* | 1/2010 | Carbunaru et al. | 607/61 |
| 2011/0251746 A1* | 10/2011 | Wu et al. | 701/22 |
| 2011/0301667 A1* | 12/2011 | Olson et al. | 607/59 |

* cited by examiner

*Primary Examiner* — M'Baye Diao
(74) *Attorney, Agent, or Firm* — King & Spalding L.L.P.

(57) ABSTRACT

The invention is related to a method and system for temperature regulation of a power switch during charging of a portable device. The method includes the steps of establishing a connection between the portable device and a charging circuit, monitoring a charging current supplied from the charging circuit to the portable device, monitoring a temperature of the power switch, while the portable device is being charged, comparing the monitored temperature with a predefined threshold temperature, and restricting the charging current, based on the comparison.

16 Claims, 3 Drawing Sheets

METHOD AND SYSTEM FOR POWER SWITCH TEMPERATURE REGULATION

TECHNICAL FIELD

The present disclosure relates to computing devices, and more particularly to a method and system for charging portable devices.

BACKGROUND

Portable electronic devices, such as cell phones, notebook computers, netbook computers, and the like are typically charged through a charger that includes a port power switch. As the current drawn by the portable device increases, temperature of the port power switch tends to increase. In general, the temperature rise may occur due to internal power dissipated by the power switch and other factors such as environmental temperature rise. This increase in temperature may cause reliability and safety issues within both a portable device as well as the charger.

Known approaches to this temperature rise problem aim to reduce the internal power dissipation by turning off the charger. Generally, these solutions include thermal and/or ambient sensors that monitor the temperature of the port power switch. If the temperature exceeds the operating range, the switch is turned "off" until the charger cools down to a desired temperature. Subsequently, the switch is turned on.

Thus, the known approaches require alternately turning on and off the port power switch for a predefined time to decrease the internal power dissipation. Alternate switching on and off, however, provides a pulsed output. This causes the average power available to be delivered to a portable device to be reduced over time. Moreover, repeated port power switch "on-and-off" cycling is an undesirable effect that may result in reduced portable device lifetime.

Therefore, there remains a need for a suitable method and system that can efficiently regulating a charger temperature without affecting the charger operation.

SUMMARY

Briefly described, and according to one embodiment, the present disclosure describes a method for regulating temperature of a charger, having a power switch. The method includes monitoring the temperature of the power switch. Subsequently, the monitored temperature is compared with a predefined threshold temperature. Finally, the charging current is restricted, based on the comparison.

The present disclosure further describes a system for regulating temperature of a charger having a power switch. The system includes a sensing module that measures a temperature of the power switch. The system further includes a comparator that compares the monitored temperature with a predefined threshold temperature. A controller restricts the power switch current output, based on the comparison.

Figure 1:
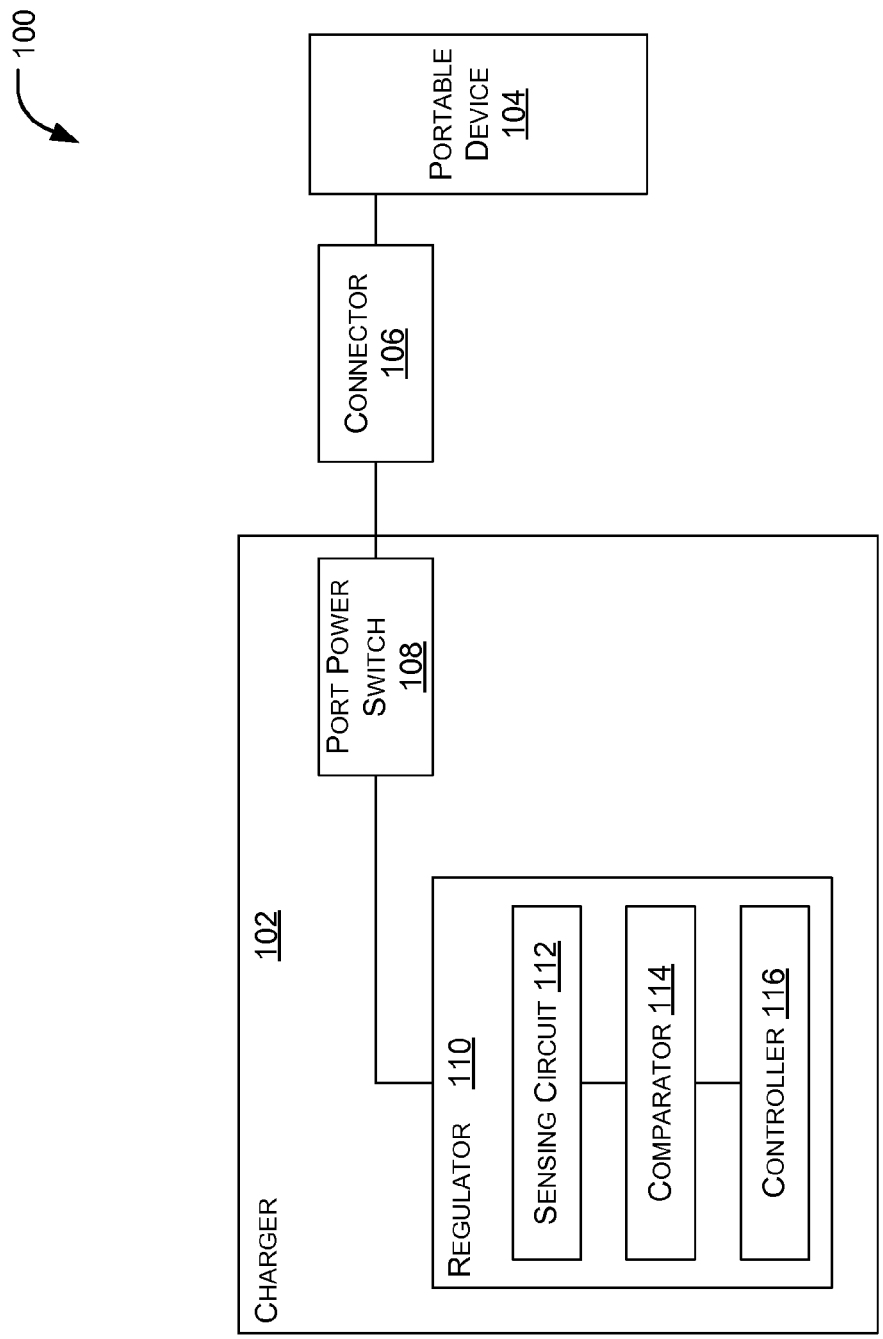
FIG. 1 illustrates an exemplary battery charging system, with thermal self-regulation according to an embodiment of the present disclosure.

While embodiments of the present disclosure are amenable to various modifications and alternative forms, specific embodiments are shown by way of example in the drawings and are described in detail. It should be understood, however, that the drawings and detailed description thereto are not intended to limit the present disclosure to the particular form disclosed, but on the contrary, the intention is to cover all modifications, equivalents, and alternatives falling within the spirit and scope of the present disclosure as defined by the appended claims.

DETAILED DESCRIPTION

Overview

The following terms are used throughout this document and are defined here for clarity and convenience.

Attach: A physical electrical connection between a downstream device and an upstream port.

Connection: The link between a downstream device and an upstream port when the device is attached to the port, and the downstream device has pulled either $D_P$ (Data Plus) or $D_M$ (Data Minus) signals high through a resistor, in order to enter signaling.

Disconnect: The loss of active USB communications between a USB host and a USB device.

Portable Device: Any USB or on-the-go (OTG) device that is capable of operating from its own battery, and is also capable of drawing current from its USB port to operate and/or charge its battery.

Embodiments of the present invention are directed to a method and system that regulates the temperature of a USB battery charger, having a power switch, while charging a portable device over a USB port. The power switch is associated with a maximum current limit value that restricts the current drawn by the portable device. The system includes a sensing module to measure the temperature of the power switch. A comparator compares this measure temperature with a predefined threshold temperature. Further, the system includes a controller that utilizes the output of the comparator to regulate the temperature of the port power switch.

Initially, when the portable device is connected to the charger, the port power switch activates and allows current to flow the portable device while monitoring temperature. The system verifies whether the monitored temperature is greater or less than the threshold temperature. If the monitored temperature is below the threshold temperature, the port power switch continues operation. Else, the system reduces the maximum current limit by a predetermined value. Subsequently, the system continues monitoring the temperature at predefined intervals and reduces the maximum current limit value at each interval while the port power switch temperature is greater than the threshold temperature. It stops reducing the current limit once a defined minimum current limit is reached or the port power temperature is no longer greater than the threshold temperature. In the former case, the system may take additional actions to reduce the port power switch temperature such as disabling the port power switch.

Exemplary Systems

FIG. 1 illustrates an exemplary battery charging system 100 for thermal self-regulation according to an embodiment of the present disclosure. The system 100 includes a charger 102 connected to a portable device 104 via a connector 106, such as a USB connector. Further, the charger 102 includes a port power switch 108, and a regulator 110, which in turn includes a sensing module 112, a comparator 114, and a controller 116.

Here, the charger 102 may be a universal or smart USB charger that can efficiently charge a number of portable devices. The charger 102 may be a standard downstream port or a charging downstream port. Moreover, the charger 102 may be compatible with either versions 1.1 or 1.2 of the battery charging specification. Alternatively, the charger 102 may be compatible with legacy devices. In an embodiment, the system 100 may include an emulation circuit that allows the connector 106 to emulate any known or configurable charging ports, making the charger 102 compatible with most portable devices available. To emulate any charging port, the charger 102 may utilize multiple known charging profiles. In addition, the charger 102 may cycle between various known charging profiles unless the connected portable device 104 starts charging.

To assure compliance with multiple charging standards or profiles, the battery charging system 100 may store a set of charging port profiles in a profile database (not shown). As already discussed, portable device 104 may utilize a number of different charging profiles to identify the type of USB port and begin charging. For example, some devices comply with the Battery Charging Specification (BCS 1.1 or BCS 1.2), while older "legacy" devices utilize their own charging protocols. USB charging port profiles are defined by current-voltage operating boundaries. The system 100 may be preloaded with a number of charging profiles such as an SDP port power profile, a CDP port power profile, a DCP port power profile, or other known profiles. Apart from the known charging profiles, the present disclosure may also store a customized charging port profile that may be updated any time. Each of these charging port profiles operates in a different current-voltage region.

The battery charging system 100 also includes the port power switch 108 that may be a USB port power switch, which protects the system 100 from excess current using current limiting characteristics. In general, the port power switch 108 limits the current drawn by the portable device 104 by setting a maximum current limit value for the charger 102. The current limit value is typically determined at power up. Conventionally, the port power switch 108 operates in three operational modes: disabled mode, constant voltage mode, or constant current mode. Both constant voltage and constant current modes are utilized depending on the current drawn by the portable device 104. The following section describes these three operating modes in detail:

Disabled mode: When the power switch 108 is turned on, the charger 102 is powered and ready to charge the portable device 104. When the power switch 108 is disabled, the charger 102 lies in a low power state.

Constant voltage mode: Here, the port power switch 108 functions as a low resistance switch. When a downstream device is connected to the port power switch 108, constant voltage mode is automatically activated. Further, constant voltage mode is also applicable when charger emulation is active. While operating in constant voltage mode, the output voltage is held relatively constant, for all current values up to the maximum current limit value. If the current drawn by the portable device 104 exceeds the maximum current limit value, then the port power switch 108 may trip (disabled mode), the system 100 may enter the error state, or a fault handling circuitry may determine subsequent actions.

Constant Current mode: This mode may be enabled when current drawn by a downstream device exceeds the maximum current limit value. At the current limiting point, the port power switch 108 may transition from constant voltage mode to constant current mode. In constant current mode, the port power switch 108 reduces its output voltage to a value less than its input voltage while maintaining its current draw at a constant value or along a pre-defined Voltage-Current slope.

As the current passing through the port power switch 108 increases, the internal power dissipation increases the temperature. Typically, when the portable device 104 is connected to the charger 102, the port power switch 108 operates in constant voltage mode. In this mode, port power switch current output increases continuously. This increasing power heats up the charger 102. The system 100 may either restrict the charger 102 temperature to below a threshold temperature value or the temperature may increase beyond this threshold value. High temperature values may damage the charger 102.

To regulate the charger 102 temperature, the present disclosure employs the regulator 110 that ensures that the temperature of the port power switch 108 is controlled below a threshold temperature value by modifying the maximum current limit value. The threshold temperature is an upper temperature limit for operating the port power switch 108. This threshold value may be set at manufacture. Further, the threshold temperature value may vary for different charging profiles applied to the portable device 104. Operating the port power switch 108 for prolonged periods of time at a temperature above the threshold value can damage the charger 102. The regulator 110 monitors the instantaneous temperature of the port power switch 108, and if the temperature exceeds the threshold value, the maximum current limit value is decreased. Reduction in maximum current limit value reduces the charging current output of the port power switch 108, which in turn reduces the internal power dissipation. To accomplish this task, the regulator 110 includes the sensing module 112, the comparator 114, and the controller 116.

The sensing module 112 measures the temperature of the power switch 108 and the current output from the port power switch 108. The sensing module 112 measures the current and temperatures values continuously or at predetermined time intervals. Any suitable current and temperature sensors known in the art may be employed for this purpose.

The comparator 114 compares the instant temperature of the port power switch 108 with the predefined threshold temperature to identify a situation that requires regulation. The comparator 114 receives the temperature sensed by the sensing module 112 and compares this value with the predefined threshold temperature. In an embodiment of the present disclosure, the comparator 114 may be an integrated circuit that compares temperature values, and provides a digital output.

The controller 116 modifies the value of the maximum current limit based on output of the comparator 114. As the threshold temperature value is approached, the controller 116 automatically adjusts the power dissipated by port power switch 108 in order to maintain operation below the threshold value. To this end, the controller 116 regulates the maximum current limit value associated with the port power switch 108.

In use, the controller 116 continually analyzes the output of the comparator 114 to identify the situation that requires thermal regulation. The controller 116 monitors the temperature sensed by the sensing module 112 and compares this value with the threshold value to identify whether the instantaneous temperature is under the operable range. If the instant temperature is below the threshold temperature, the controller 116 maintains the operation of the port power switch 108 does not change the current limit value. If the instant temperature is greater than the threshold value, the controller 116 reduces the maximum current limit value. To this end, the controller 116 sends a signal to power switch 108 reducing the maximum current limit value. Thus, the charging current output of the port power switch 108 is also reduced.

In an embodiment of the present disclosure, if the current output of the port power switch 108 reduces below the updated maximum current limit value, the power switch may switch to the constant voltage mode. In another situation, if the port power switch temperature is no longer above the temperature threshold, then the regulator 110 maintains the switch in the constant current mode or may return the switch 108 to higher levels of its maximum current limit value. In another situation, if the current limit reaches its minimum value and the port power switch temperature is still greater than the temperature threshold, then the regulator 110 may disable the port power switch. 108

In addition, the controller 116 may analyze the comparator 114 output at regular intervals or predefined intervals. At the end of each interval, the controller 116 decides to maintain the maximum current limit value, decrease it, or take other actions. Furthermore, the maximum current limit value may be reduced by a fixed or varying amount at the end of each interval. For example, the controller 116 may analyze the output of the comparator 114 after every 100 milliseconds and if the temperature is above the threshold value, the maximum current limit value is reduced by 0.5 Amperes each time. Alternatively, at every 5 millisecond interval, the maximum current limit value may be reduced by 0.5 Amperes, followed by 0.3 Amperes, 0.2 Amperes, and so on. Moreover, the analyzing intervals may also vary from 100 millisecond in the first interval to 75 milliseconds, or any arbitrary time later on. As well, the change of current limit reduction or interval time need not be monotonic.

Exemplary Methods

Figure 2:
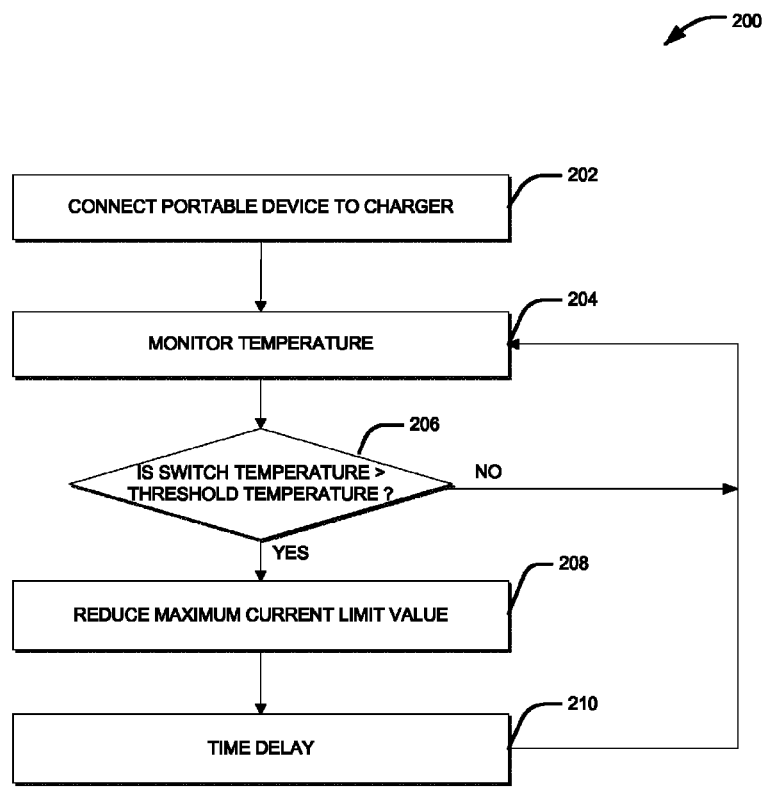
FIG. 2 illustrates an exemplary method for regulating temperature of a portable device according to an embodiment of the present disclosure.

FIG. 2 illustrates an exemplary method 200 for regulating the temperature of the port power switch 108. The method 200 may be used in conjunction with any of the systems or devices shown in the previously described figure, among other devices. In various embodiments, some of the method elements shown may be performed concurrently, in a different order than shown, or may be omitted. Additional method elements may be performed as desired. As shown, the method 200 may operate as follows.

The method 200 begins at step 202, when the portable device 104 is connected to the charger 102, via the connector 106. The connection enables the portable device 104 to draw current from the charger 102. The port power switch 108 limits the flow of portable device current by setting a maximum current limit for the charger 102. At this stage, the port power switch 108 provides a constant voltage output and an increasing current output. As the charging current increases beyond a maximum current limit value, the port power switch 108 transitions from the constant voltage mode to constant current mode.

At step 204, the port power switch temperature is measured. Once the port power switch 108 starts operating in the constant current mode, the sensing module 112 measuring the port power switch temperature to identify whether the switch is operating under operable temperature conditions. Subsequently, at step 206, the comparator 114 compares whether the monitored temperature is above the threshold temperature. If no, the method 200 includes maintaining the current operating status of the port power switch 108. Next, the method 200 loops back to the step 204 where it continues monitoring the instantaneous temperature of the switch 108 to confirm whether over temperature condition is encountered.

If the monitored temperature is greater than the threshold temperature, the maximum current limit value of the port power switch 108 is decreased at step 208. As discussed, the controller 116 reduces the maximum current limit value to decrease the power dissipated by the switch 108. Next, at step 210, the method 200 introduces a predefined time delay and loops back to the step 204 to measures the instantaneous temperature of the switch 108. Subsequently, the method repeats steps 204 to 210 until the power switch temperature is above the threshold temperature.

In another embodiment of the present disclosure, if the power switch temperature does not fall below the threshold temperature by reducing the maximum current limit value to its minimum value, the controller 116 may shutdown the charger 102 for a predefined time period to cool the switch 108.

Exemplary Chart

Figure 3:
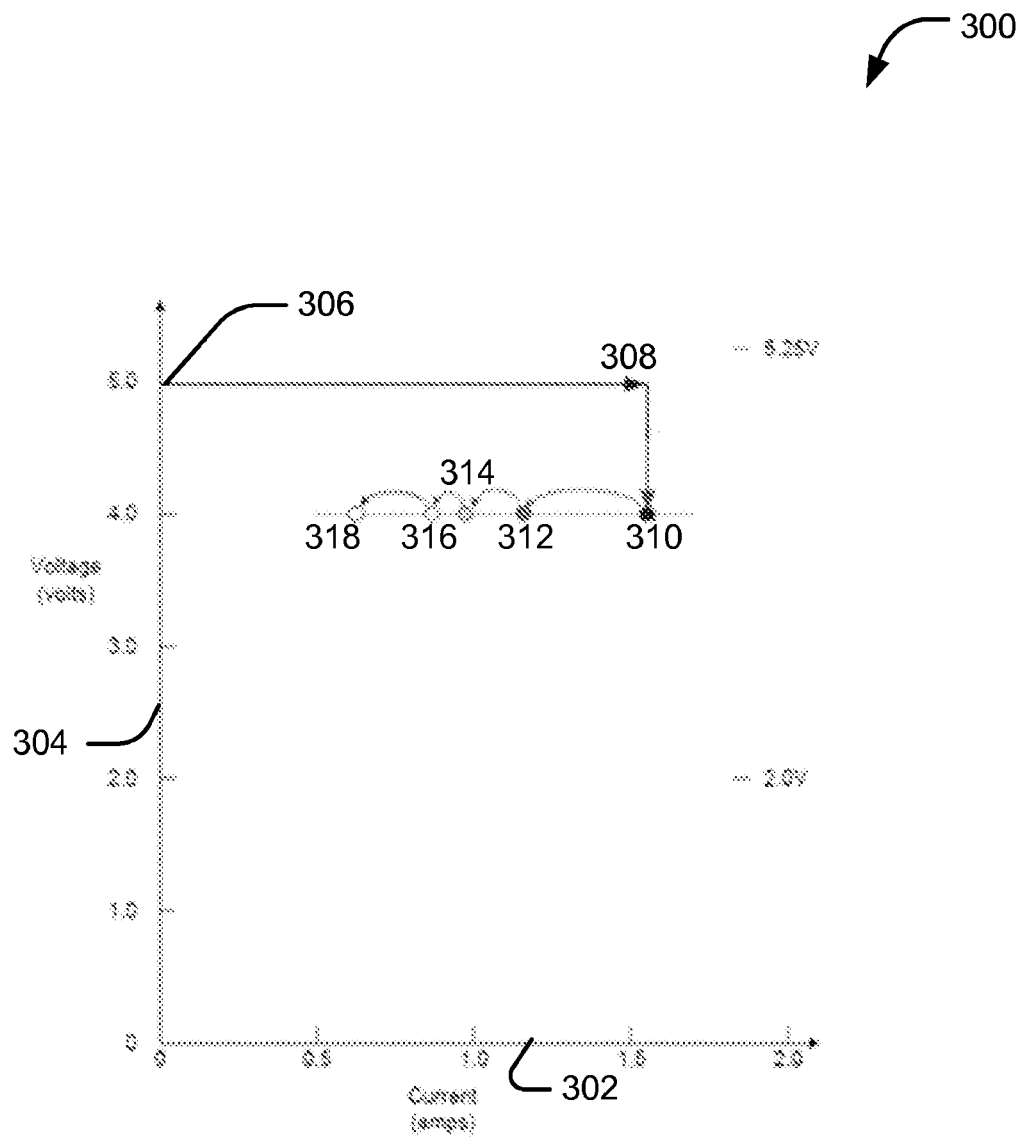
FIG. 3 illustrates an exemplary chart depicting the current-voltage relationship of a port power switch during temperature regulation according to an embodiment of the present disclosure.

FIG. 3 illustrates an exemplary chart 300 depicting the current-voltage relationship of the port power switch 108 during temperature regulation according to an embodiment of the present disclosure. The chart 300 illustrates the variation in charging current, X-axis 302, and the voltage output of the port power switch 108, Y-axis 304.

In chart 300, start point 306 represents a point at which the portable device 104 connects to the charger 102. At start, the charging voltage may be substantially equal to the input voltage of the charger 102, and the port power switch 108 operates in constant voltage mode with current increasing and voltage being set to a fixed value. The controller 116 monitors the charging current and temperature throughout the operation of the switch 108. Chart 300 shows an embodiment of the present disclosure where the charging voltage attains a constant value of 5 Volts and the charging current starts increasing from the start point 306. The voltage current slope maintains a substantial straight line until a current limiting point 308. Subsequently, the port power switch 108 operates in constant current mode.

As the current output of the port power switch 108 exceeds a maximum current limit value, the output voltage decreases and the current output is set to a fixed constant current value, also known as the limiting current. The transition from constant voltage mode to constant current mode starts by reducing the voltage and modifying the output current until reaching a constant current point 310. At constant current point 310, the output voltage is reduced to 4 volts and output current is set to 1.5 Amps. At this stage, the controller 116 identifies the constant current operating mode of the switch 108 by measuring the current output.

At any point, the controller 116 identifies whether the charger 102 requires temperature regulation. This is more likely to occur while operating in constant current mode but may occur at any point. At point 310, the sensing module 112 measures the instant temperature of the switch 108. If the instant temperature is above a threshold temperature associated with the port power switch 108, the maximum current limit value is decreased. Else, the current operating conditions are maintained.

Point 312 represents a point at which the maximum current output is reduced to 1.2 Amps. Subsequently, the comparator 114 compares the instant temperature with the threshold value at predefined intervals and in case the instant temperature exceeds the threshold value, the maximum current limit value is decreased at each interval. Points 314, 316, and 318 represent points at which the instant temperature continues to be above the threshold value and thus maximum current limit value is reduced to 1.0 Amperes, 0.9 Amps, and 0.6 Amps, respectively. At point 318, the instant temperature is below the threshold value and thus the controller 116 allows the charger 102 to operate at this stage, with charging current being set to 0.6 Amperes and voltage output reduced to 4 Volts. Subsequently, the portable device continues drawing this instant constant current value until fully charged.

The methods and systems discussed in the present disclosure provide a battery charging system that regulates the temperature of a charger internally. The system monitors the temperature of a port power switch of the charger and if the instantaneous temperature exceeds a threshold temperature value, the system reduces the maximum current limit associated with the port power switch. Reducing this limit reduces the port power switch current output, which in turn decreases the internal power dissipation.

What is claimed is:

1. A method for regulating temperature of a charger having a port power switch wherein the port power switch operates at a constant voltage mode and a constant current mode, the method comprising:
    monitoring the port power switch temperature;
    comparing the monitored temperature with a predefined threshold temperature; and
    based on the comparison, modifying the charger current output by adjusting a maximum current limit value associated with the port power switch; and
    switching the port power switch between the constant voltage mode and the constant current if the charger current output drops below the adjusted maximum current limit value.

2. The method of claim 1 further comprising attaching a portable device with the charger.

3. The method of claim 1, wherein the current is increased in constant voltage mode based on a determination that the monitored temperature is below the threshold temperature.

4. The method of claim 1, wherein the step of modulating the current includes: maintaining the current to a fixed constant current value; or reducing the maximum current limit associated with the port power switch.

5. The method of claim 4, wherein the fixed constant current value is assigned by switching the power switch to a constant current mode upon a determination that the current exceeds the maximum current limit.

6. The method of claim 5, wherein the current is maintained at the fixed constant current value based on a determination than the monitored temperature is below the threshold temperature.

7. The method of claim 4, wherein the modulating step reduces the maximum current limit value when the monitored temperature exceeds the predefined threshold temperature.

8. The method of claim 1 further including repeating the monitoring, comparing and modulating step upon a determination that the monitored temperature is above the threshold temperature.

9. A system for regulating temperature of a charger having a power switch wherein the power switch operates at a constant voltage mode and a constant current mode, the system comprising:
    a sensing module configured to measure the power switch temperature;
    a comparator configured to compare the monitored temperature with a predefined threshold temperature; and
    a controller configured, based on the comparison, to modify the charger current by adjusting a maximum current limit value associated with the power switch and to switch the power switch between the constant voltage mode and the constant current mode if the charger current output drops below the adjusted maximum current limit value.

10. The system of claim 9 further comprising a connector adapted to attach a portable device to the charger.

11. The system of claim 9, wherein the charging current increases upon a determination that the measured temperature is below the threshold temperature.

12. The system of claim 9, wherein the controller is configured to: maintain the charger current to a fixed constant current value; or reduce the maximum current limit value associated with the power switch.

13. The system of claim 12, wherein the charging current attains the fixed constant current value when the charging current exceeds the maximum current limit value.

14. The system of claim 12, wherein the controller maintains the charging current to the fixed constant current value upon on a determination that the monitored temperature is below the threshold temperature.

15. The system of claim 12, wherein in the controller reduces the maximum current limit value upon a determination that the monitored temperature is above the threshold temperature.

16. The system of claim 15, wherein the controller is configured to reduce the maximum current limit value until the monitored temperature is above the threshold temperature.

* * * * *